United States Patent
Zebiak et al.

(10) Patent No.: US 12,552,266 B2
(45) Date of Patent: Feb. 17, 2026

(54) ELECTRIC MOTOR TORQUE CONTROL FOR ELECTRIC VEHICLES

(71) Applicant: GM GLOBAL TECHNOLOGY OPERATIONS LLC, Detroit, MI (US)

(72) Inventors: Matthew Stephen Zebiak, Ann Arbor, MI (US); James M. Gessner, Hartland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 603 days.

(21) Appl. No.: 18/073,042

(22) Filed: Dec. 1, 2022

(65) Prior Publication Data

US 2024/0181896 A1    Jun. 6, 2024

(51) Int. Cl.
*B60L 15/20* (2006.01)
*H02P 23/00* (2016.01)
*B60K 26/02* (2006.01)

(52) U.S. Cl.
CPC ...... *B60L 15/2045* (2013.01); *H02P 23/0009* (2013.01); *B60K 26/02* (2013.01); *B60K 2026/028* (2013.01); *B60L 2240/12* (2013.01); *B60L 2240/14* (2013.01); *B60L 2240/26* (2013.01); *B60L 2240/421* (2013.01); *B60L 2240/423* (2013.01); *B60L 2240/642* (2013.01); *B60L 2250/26* (2013.01)

(58) Field of Classification Search
CPC .......... B60W 2720/106; B60W 20/00; B60W 2540/10; B60W 2552/15; B60W 2710/083; B60W 2710/105; B60W 10/06; B60W 10/08
See application file for complete search history.

(56) References Cited

U.S. PATENT DOCUMENTS

| | | | | |
|---|---|---|---|---|
| 5,508,923 A | * | 4/1996 | Ibamoto | F02D 11/105 701/58 |
| 6,777,904 B1 | * | 8/2004 | Degner | G05D 17/02 318/609 |
| 6,822,462 B1 | * | 11/2004 | Staerzl | C23F 13/04 324/700 |
| 6,973,890 B1 | * | 12/2005 | Staerzl | B63B 59/04 114/67 R |
| 9,776,640 B1 | * | 10/2017 | Tian | B60W 50/0098 |

(Continued)

FOREIGN PATENT DOCUMENTS

| | | | | |
|---|---|---|---|---|
| DE | 4306086 A1 | * | 9/1993 | .......... B60K 31/047 |
| DE | 102015113517 A1 | * | 2/2017 | .............. H02P 3/025 |

(Continued)

*Primary Examiner* — Redhwan K Mawari

(57) ABSTRACT

An electric vehicle acceleration control system includes an electric motor configured to drive wheels of an electric vehicle, a steering wheel configured to steer the wheels of the electric vehicle, an acceleration paddle adjacent the steering wheel, and a vehicle control module configured to, in response to detecting activation of the acceleration paddle, set a target speed value, determine an average acceleration value to reach the target speed value, obtain a stored torque profile according to the target speed value and the average acceleration value, the stored torque profile including a specified torque value for each of multiple speed breakpoints, and control the electric motor by commanding the specified torque value at each of the multiple speed breakpoints.

19 Claims, 7 Drawing Sheets

(56) References Cited

U.S. PATENT DOCUMENTS

| | | | |
|---|---|---|---|
| 10,534,358 B2* | 1/2020 | Van Miert | B63B 79/15 |
| 11,338,794 B2* | 5/2022 | Meyer | B60W 20/19 |
| 2009/0072778 A1* | 3/2009 | Schulz | H02P 6/10 |
| | | | 318/721 |
| 2012/0310455 A1* | 12/2012 | Arnett | B60W 20/00 |
| | | | 701/22 |
| 2014/0277867 A1* | 9/2014 | Nedorezov | B60W 10/08 |
| | | | 903/930 |
| 2016/0303998 A1* | 10/2016 | Cho | B60L 7/18 |
| 2017/0282932 A1* | 10/2017 | Tian | B60W 50/0098 |
| 2018/0105158 A1* | 4/2018 | Namuduri | B60W 40/076 |
| 2018/0304969 A1* | 10/2018 | Van Miert | B63J 99/00 |
| 2020/0173390 A1* | 6/2020 | Shin | F02D 41/1406 |
| 2020/0363209 A1* | 11/2020 | Isojärvi | G01S 19/42 |
| 2021/0171030 A1* | 6/2021 | Lee | H04W 4/40 |
| 2022/0212651 A1* | 7/2022 | Tascillo | B60W 20/12 |

FOREIGN PATENT DOCUMENTS

| | | | | |
|---|---|---|---|---|
| DE | 102022100065 A1 * | 7/2022 | | B60W 40/00 |
| JP | 2019131131 A * | 8/2019 | | |
| JP | 2020043715 A * | 3/2020 | | |
| JP | 2022095221 A * | 6/2022 | | |
| KR | 20160123654 A * | 10/2016 | | B60W 40/105 |

* cited by examiner

| | τ1 | τ2 | τ3 | τ4 | τ5 | τ6 | τ7 | τ8 | τ9 |
|---|---|---|---|---|---|---|---|---|---|
| ω1 | E11 | E12 | E13 | E14 | E15 | E16 | E17 | E18 | E19 |
| ω2 | E21 | E22 | E23 | E24 | E25 | E26 | E27 | E28 | E29 |
| ω3 | E31 | E32 | E33 | E34 | E35 | E36 | E37 | E38 | E39 |
| ω4 | E41 | E42 | E43 | E44 | E45 | E46 | E47 | E48 | E49 |
| ω5 | E51 | E52 | E53 | E54 | E55 | E56 | E57 | E58 | E59 |
| ω6 | E61 | E62 | E63 | E64 | E65 | E66 | E67 | E68 | E69 |
| ω7 | E71 | E72 | E73 | E74 | E75 | E76 | E77 | E78 | E79 |

FIG. 4

ELECTRIC MOTOR TORQUE CONTROL FOR ELECTRIC VEHICLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric motor torque control for electric vehicles, including low energy torque curve profiles.

Vehicles typically include an acceleration pedal that a driver may operate by pressing with their foot to different positions, to selectively control levels of acceleration of the vehicle. Full-speed-range automated driving systems may be used in stop and go traffic, but their launch characteristics (e.g., accelerations from a stop) are not optimized for energy efficiency.

SUMMARY

An electric vehicle acceleration control system includes an electric motor configured to drive wheels of an electric vehicle, a steering wheel configured to steer the wheels of the electric vehicle, an acceleration paddle adjacent the steering wheel, and a vehicle control module configured to, in response to detecting activation of the acceleration paddle, set a target speed value, determine an average acceleration value to reach the target speed value, obtain a stored torque profile according to the target speed value and the average acceleration value, the stored torque profile including a specified torque value for each of multiple speed breakpoints, and control the electric motor by commanding the specified torque value at each of the multiple speed breakpoints.

In other features, the acceleration paddle includes a first detent at a first position relative to the steering wheel, and a second detent at a second position relative to the steering wheel, and the vehicle control module is configured to set the average acceleration value to a first acceleration setting in response to activation of the acceleration paddle to the first detent, and to set the average acceleration value to a second acceleration setting greater than the first acceleration setting in response to activation of the acceleration paddle to the second detent.

In other features, the vehicle control module is configured to obtain a speed limit value of a road where the electric vehicle is located, and set the target speed value to the obtained speed limit value.

In other features, in the stored torque profile, the specified torque value for each one of the multiple speed breakpoints is assigned by determining which one of multiple torque values of the electric motor uses a least amount of energy to advance a speed of the electric vehicle to a next one of the multiple speed breakpoints, subject to maximum and minimum torque constraints of the electric motor.

In other features, the vehicle control module is configured to determine a road grade of a road where the electric vehicle is located, and adjust the specified torque value associated with the one of multiple speed breakpoints corresponding to a current speed of the electric vehicle, according to the determined road grade.

In other features, the vehicle control module is configured to obtain a headway control signal indicative of a distance between the electric vehicle and another vehicle located in front of the electric vehicle, and adjust the specified torque value associated with the one of multiple speed breakpoints corresponding to a current speed of the electric vehicle, in response to the headway control signal commanding a lower torque value than the specified torque value.

In other features, the vehicle control module is configured to obtain an acceleration pedal signal indicative of a level of activation of an accelerator pedal of the electric vehicle, and adjust the specified torque value associated with the one of multiple speed breakpoints corresponding to a current speed of the electric vehicle, in response to the acceleration pedal signal commanding a greater torque value than the specified torque value.

In other features, the vehicle control module is configured to stop controlling the electric motor according to the stored torque profile, in response to detecting deactivation of the acceleration paddle.

A method of controlling torque of an electric motor of an electric vehicle includes defining multiple motor speed breakpoints associated with an acceleration path of an electric vehicle, obtaining, at each of multiple motor speed breakpoints, an efficiency value for each of multiple torque settings of an electric motor, and at each torque setting for each motor speed breakpoint, computing an amount of power used from a battery system of the electric vehicle to maintain the torque setting until a next one of the multiple motor speed breakpoints is reached, determining a time period to accelerate from the motor speed breakpoint to a next one of the multiple motor speed breakpoints, and calculating an amount of energy consumed to accelerate from the motor speed breakpoint to a next one of the multiple motor speed breakpoints according to the amount of power and the time period. The method includes, for each of the multiple motor speed breakpoints, identifying one of the multiple torque settings corresponding to the motor speed breakpoint, having a lowest amount of energy consumed, and storing the identified one of the multiple torque settings in a low energy torque curve profile. The method includes controlling operation of the electric motor according to the low energy torque curve profile.

In other features, the method includes storing the low energy torque curve profile as an array of specified torque values each associated with a different vehicle speed value, wherein the controlling operation of the electric motor includes commanding a one of the array of specified torque values corresponding to a determined speed of the electric vehicle.

In other features, the low energy torque curve profile is a first low energy torque curve profile associated with a first target speed value and a first target acceleration value, and the method includes generating a second low energy torque curve profile according to a second target speed value and a second target acceleration value, storing the first low energy torque curve profile and the second low energy torque curve profile in a memory associated with a vehicle control module, obtaining a target speed input and a target acceleration input of the electric vehicle, and selecting one of the first low energy torque curve profile and the second low energy torque curve profile for controlling operation of the electric motor, based on the target speed input and a target acceleration input.

In other features, the method includes, at each of the multiple motor speed breakpoints, determining a maximum torque constraint indicative of a maximum torque at which the electric motor is able to ramp down to a torque setting associated with a target speed within a target acceleration time between the motor speed breakpoint and the target speed, and in response to determining that a torque setting of the low energy torque curve profile corresponding to the motor speed breakpoint exceeds the maximum torque constraint, adjusting the torque setting of the low energy torque curve profile to a value of the maximum torque constraint.

In other features, the method includes, at each of the multiple motor speed breakpoints, determining a minimum torque constraint indicative of a minimum desired acceleration value associated with the motor speed breakpoint, and in response to determining that a torque setting of the low energy torque curve profile corresponding to the motor speed breakpoint is less than the minimum torque constraint, adjusting the torque setting of the low energy torque curve profile to a value of the minimum torque constraint.

In other features, the method includes obtaining a target acceleration time period between a first one of the multiple motor speed breakpoints and a last one of the multiple motor speed breakpoints, calculating a total acceleration time period between a first one of the multiple motor speed breakpoints and a last one of the multiple motor speed breakpoints according to each identified torque setting of the low energy torque curve profile, and in response to a difference between the target acceleration time period and the calculated total acceleration time period exceeding an error threshold, adjusting at least one identified torque setting of the low energy torque curve profile.

In other features, the adjusting includes, in response to the target acceleration time period being less than the calculated total acceleration time period, increasing at least one of the torque settings of the low energy torque curve profile according to a difference in energy consumed between two different torque settings at a same one of the multiple motor speed breakpoints.

In other features, the method includes determining a maximum torque constraint indicative of a maximum torque at which the electric motor is able to ramp down to a torque setting associated with a target speed within a target acceleration time between the motor speed breakpoint associated with the increased at least one of the identified torque settings and the target speed, and in response to determining that the increased at least one of the torque settings exceeds the maximum torque constraint, adjusting the increased at least one of the torque settings to a value of the maximum torque constraint.

In other features, the adjusting includes, in response to the target acceleration time period being greater than the calculated total acceleration time period, decreasing at least one of the torque settings of the low energy torque curve profiles according to a difference in energy consumed between two different torque settings at a same one of the multiple motor speed breakpoints.

In other features, the method includes determining a minimum torque constraint indicative of a minimum desired acceleration value associated with the motor speed breakpoint associated with the decreased at least one of the identified torque settings and a target speed, and in response to determining that the decreased at least one of the torque settings is less than the minimum torque constraint, adjusting the decreased at least one of the torque settings to a value of the minimum torque constraint.

In other features, determining the time period to accelerate from the motor speed breakpoint to a next one of the multiple motor speed breakpoints includes determining the time period based on at least one of a tire rolling radius of the electric vehicle, a mass of the electric vehicle, a vehicle road load coefficient, a final drive ratio, and a drive unit loss.

An electric vehicle acceleration control system includes an electric motor configured to drive wheels of an electric vehicle, a steering wheel configured to steer the wheels of the electric vehicle, an acceleration paddle adjacent the steering wheel, and a vehicle control module configured to, in response to detecting activation of the acceleration paddle, obtain a stored low energy torque profile from a memory associated with the vehicle control module, the stored low energy torque profile including, for each of multiple motor speed breakpoints, a specified torque value having a lowest amount of energy consumed within a group of torque values associated with the multiple motor speed breakpoint, determine a current speed of the electric vehicle, and control the electric motor by commanding the specified torque value of the stored low energy torque profile associated with the motor speed breakpoint that corresponds to the current speed of the electric vehicle.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a table illustrating an example low energy torque curve profile according to the present disclosure;

In the drawings, reference numbers may be reused to identify similar and/or identical elements.

DETAILED DESCRIPTION

Figure 1:
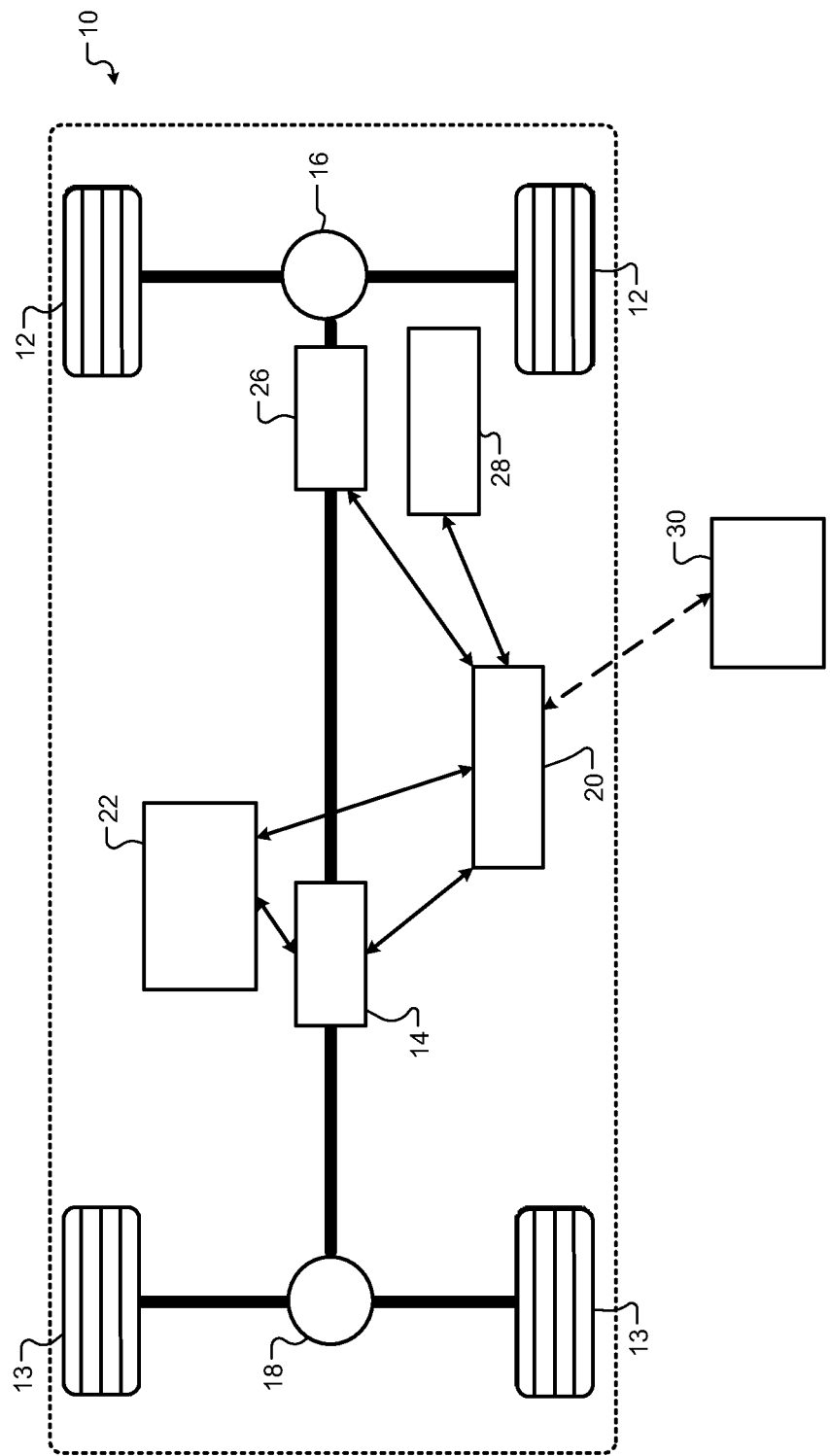
FIG. 1 is a functional block diagram of an example of a vehicle including an automated motor torque control system for implementing a low energy torque curve profile, according to the present disclosure.

In some examples of the present disclosure, a vehicle control module may use pre-calculated, vehicle-specific torque profiles that reduce or minimize energy consumption during each acceleration event to provide significant energy savings, particularly in frequent stop and go driving situations such as urban settings.

In addition to a vehicle accelerator pedal, or as an alternative, some example systems may include an acceleration paddle that they can pull to accelerate the vehicle in an optimized manner to reduce energy consumption and boost driving range. The acceleration paddle may be located adjacent to the steering wheel (e.g., behind the steering wheel, to the side of the steering wheel, etc.), or may be located elsewhere in the vehicle. The vehicle acceleration paddle may be used at same time as a traditional accelerator pedal if greater performance is desired, or the acceleration paddle may be released (e.g., completely released) if less performance is needed.

In some examples, an electric vehicle (EV) motor efficiency map may specify a torque path that uses a reduced or minimum amount of energy, and the path of the efficiency map may be deterministic and well-defined. Other attributes of the vehicle (e.g., road load, torque-dependent losses, etc.), and desired characteristics of the launch (e.g., average acceleration, target ending speed, minimum acceleration at launch, etc.), may be incorporated with the motor efficiency map to generate unique torque profiles for a particular application or vehicle, which reduces or minimizes energy use while respecting the input constraints.

For example, a minimum-energy path for a 4000 lb. vehicle may accelerate the vehicle from zero to 35 mph in fourteen seconds. If a driver desires to instead reach 35 mph in nine seconds, an example process may strategically deviate from an absolute minimum energy path so the nine second time constraint can be satisfied (e.g., by determining where to increase torque to meet the nine second acceleration constraint, while minimizing an amount of extra energy consumption needed to increase the torque and rate of acceleration).

In some examples, a vehicle control module may determine (e.g., in real-time, in a vehicle), which input constraints are appropriate to use in present road conditions, so that a proper acceleration profile can be executed in response to a pull (or other activation) of the acceleration paddle (or by default for some example automated driving technologies).

In various implementations, an example system may generate tables of acceleration profiles (e.g., motor torque values versus vehicle speed values), which may be stored in a vehicle control module, such as a propulsion controller of a vehicle control module. A two-dimensional motor efficiency table may be reformatted to compute the efficiency at each possible speed/torque point in desired speed and torque ranges (e.g. [0, 250, 500, . . . 10000 rpm] and [10, 20, 30, . . . 450 Nm]).

Example systems may compute an upstream power requirement (e.g., power supplied by a battery system of the vehicle) in order to maintain each possible torque value until a next motor speed breakpoint is reached, based on calculated motor efficiencies. A system may compute a time needed to accelerate from each motor speed breakpoint to a next motor speed breakpoint (at each possible torque value), based on one more of vehicle road load parameters, drive unit losses, rolling radius of a wheel of the vehicle, final drive ratio, etc.

In some examples, a system may multiply a time required at each speed/torque breakpoint, by the power needed at to maintain the specified torque value at each speed/torque breakpoint, in order to determine the total energy needed to advance from one speed breakpoint to the next, at each possible torque value. The system may identify an index of the minimum energy expenditure at each motor speed breakpoint, in order to generate a low energy (e.g., minimum energy) path through the speed-torque map for that particular vehicle.

In various implementations, a system may impose a constraint to command no more than road load torque at the motor speed breakpoint corresponding to the target ending speed of the acceleration maneuver, in order to inhibit or prevent overshoot of the target ending speed. The constraint may be extended backwards in motor speed, based on a maximum torque ramp rate of the motor. For example, if the motor torque setting to maintain a target ending speed is a motor toque level five out of ten, and the motor torque is only able to ramp down two torque levels during a time period of acceleration up to the target ending speed from a motor speed breakpoint immediately below the target ending speed, a maximum torque constraint of motor torque level seven may be imposed at the motor speed breakpoint immediately below the target ending speed (e.g., because if the motor torque was at level eight or higher it would not be able to reduce torque fast enough to be at level five when the target ending speed is reached, thereby overshooting the target ending speed until the motor torque can eventually ramp down to level five).

In some examples, the system may impose an optional minimum torque constraint, such as at the beginning of an acceleration maneuver. For example, if the system determines that starting acceleration from zero at motor torque level two provides the minimum energy torque to reach the next speed breakpoint after zero, but drivers may feel that a torque level of two from zero speed may seem like too slow of an acceleration from a stop for an enjoyable driving experience, a minimum torque constraint may specify that a torque level of, e.g., at least level four should be used when starting from zero.

In various implementations, a system may check whether any determined optimal torque points are in violation of either constraint mentioned above (e.g., the system may determine whether any identified torque setting values of the minimum torque curve profile are outside of maximum or minimum torque constraints). If any optimal torque points of the torque curve profile are in violation of either constraint, the system may correct the operating point by clipping the torque settings in the profile to the maximum torque constraint (e.g., at the end of the acceleration maneuver) and/or the minimum torque constraint (e.g., at the beginning of the acceleration maneuver).

In some examples, the system may compute a time taken to complete the acceleration maneuver once the constraints have been satisfied (e.g., calculating a sum of the total time at each identified torque setting value in the torque curve profile, after any torque setting values are adjusted according to minimum or maximum torque constraints). The computed time taken may be compared to a desired time for the acceleration maneuver, which may be an input such as how long a driver would like the acceleration maneuver to take (e.g., not too fast to feel rushed and not too long to feel slow). If the difference in computed time taken and desired time for the acceleration maneuver is less than an error threshold (e.g., a user-specified time value tolerance), the torque curve profile may be considered as complete, and stored in a vehicle memory for use in controlling torque of an electric motor of the vehicle according to a low energy torque curve path.

If the difference between the computed time taken and the desired time for the acceleration maneuver is greater than the error threshold, the system may adjust one or more torque settings of the torque curve path in order to satisfy the desired time for the acceleration maneuver. For example, if the system determines that time must be added to the computed time taken in order to reach the desired time for the acceleration maneuver, the system may set a dE/dt allowance (e.g. 0.001 Joule per second may be added to maneuver), and compute dE/dt (e.g., a derivative of energy needed with respect to time taken, relative to the minimum energy/time pair) for each motor speed row, across all possible torque setting values.

The system may identify a first index where dE/dt is below the allowed threshold, and change the operating point in that motor speed breakpoint row to the identified index. In various implementations, the system may check that neither a maximum torque constraint nor a minimum torque constraint is violated by the new index, and then clip the new index to either the maximum torque constraint value or the minimum torque constraint value if a constraint is violated.

After the example process is complete for all motor speed breakpoint rows, the system may recompute the time taken for the entire acceleration maneuver. If the difference between the recomputed time taken and the time for the acceleration maneuver is less than the error threshold, the revised torque curve profile may be considered as complete, and stored in a vehicle memory for use in controlling torque of an electric motor of the vehicle. If the difference is still greater the error threshold, the system may increment the dE/dt allowance by a small value and continue repeating the process or identifying one or more indexes to update operating torque points in the profile, until the difference is less than the error threshold.

if the system determines that time must be removed from the computed time taken in order to reach the desired time for the acceleration maneuver, the system may set a negative dE/dt allowance (e.g. negative 0.001 Joule per second may be removed from the acceleration maneuver), and compute dE/dt for each motor speed row, across all possible torque setting values.

The system may identify a first index where dE/dt is above the allowed threshold (e.g., because the sign of the dE/dt allowance is negative), and change the operating point in that motor speed breakpoint row to the identified index. In various implementations, the system may check that neither a maximum torque constraint nor a minimum torque constraint is violated by the new index, and then clip the new index to either the maximum torque constraint value or the minimum torque constraint value if a constraint is violated.

After the example process is complete for all motor speed breakpoint rows, the system may recompute the time taken for the entire acceleration maneuver. If the difference between the recomputed time taken and the time for the acceleration maneuver is less than the error threshold, the revised torque curve profile may be considered as complete, and stored in a vehicle memory for use in controlling torque of an electric motor of the vehicle. If the difference is still greater than the error threshold, the system may decrement the dE/dt allowance by a small value and continue repeating the process or identifying one or more indexes to update operating torque points in the profile, until the difference is less than the error threshold.

In some examples, use of a low energy torque profile may provide energy savings on most accelerations (such as 2%-3% energy savings per acceleration, which could lead to ten miles or more of additional city driving range on, for example, a 300+ mile electric vehicle). For example, 2% or more average savings may occur across launches on, e.g., the Environmental Protection Agency's Multi-Cycle Test (MCT) procedure, for reference.

Low energy (e.g., minimum energy) torque curve profiles may be stored in a propulsion controller of a vehicle control module, and referenced in a flexible manner (such as for any given target speed and desired time period to achieve that speed, a specified torque profile associated with the target speed and desired time period may be looked up). This may reduce the amount of computation that needs to be performed on-board in the vehicle control module in real time.

In various implementations, a system may provide optimized torque profiles to be used by any automated driving technology, such as adaptive cruise control (ACC), Super Cruise automated driving, Ultra Cruise automated driving, autonomous vehicles, a zero-pedal drive acceleration paddle, etc. For example, an acceleration paddle may allow for zero-pedal driving in urban stop and go conditions. An acceleration paddle may provide a more consistent, smoother driving feel, particularly in urban settings, and may provide additional accessibility advantages for some drivers.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle. For purposes of illustration, drive units including a battery system 22 and an electric motor will be described below.

Some examples of the drive unit 14 may include any suitable electric motor, a power inverter, and a motor controller configured to control power switches within the power inverter to adjust the motor speed and torque during propulsion and/or regeneration. The battery system 22 provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the battery system 22 and the drive unit 14 (e.g., by commanding torque settings of an electric motor of the drive unit 14). The vehicle control module 20 may receive inputs for controlling components of the vehicle, such as signals received from the steering wheel 26 and the acceleration paddle 28. Example input parameters may include, but are not limited to, a tire rolling radius of the electric vehicle, a mass of the electric vehicle, a vehicle road load coefficient, a final drive ratio, and a drive unit loss, etc. The vehicle control module 20 may monitor telematics of the vehicle 10 for safety purposes, such as vehicle speed, vehicle location, vehicle braking and acceleration, etc.

The vehicle control module may include any suitable processing circuitry and memory to implement control functions, including examples of processes for controlling torque of an electric motor of the drive unit 14, as described herein. In some examples, the vehicle control module 20 may be considered as a system controller (and may include a propulsion controller).

The vehicle control module 20 may receive signals from any suitable components for monitoring one or more aspects of the vehicle, such as one or more sensors, one or more cameras, one or more microphones, etc. The vehicle control module 20 may communicate with another device via a wireless communication interface, which may include one or more wireless antennas for transmitting and/or receiving wireless communication signals. For example, the wireless communication interface may communicate via any suitable wireless communication protocols, including but not limited to vehicle to vehicle (V2V) communication, vehicle to load (V2L) communication, Wi-Fi communication, wireless area network (WAN) communication, cellular communication, personal area network (PAN) communication, short-range wireless communication (e.g., Bluetooth), etc. The wireless communication interface may communicate with a remote computing device 30 over one or more wireless and/or wired networks, e.g., to receive torque curve profile tables including multiple low energy torque curves.

Figure 2:
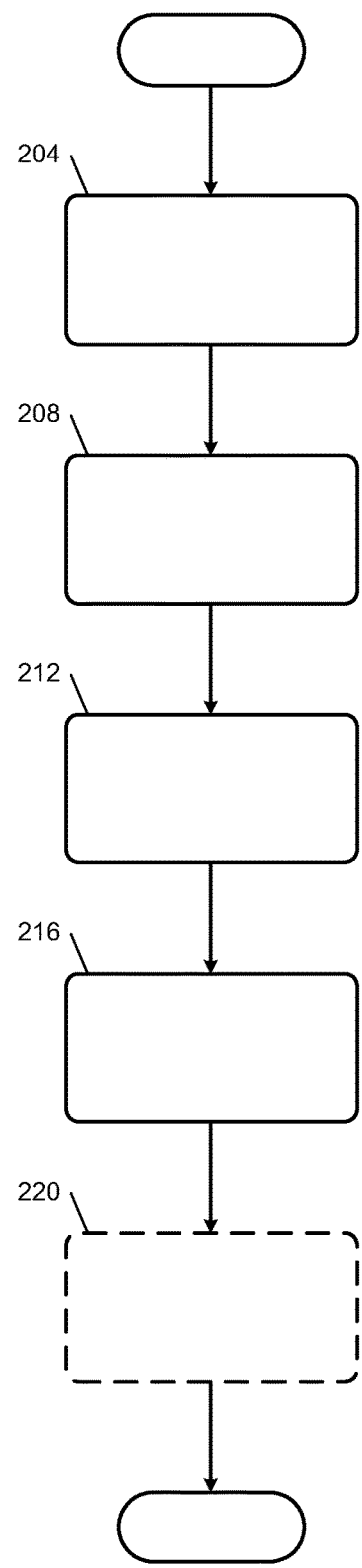
FIG. 2 is a flowchart illustrating an example process for controlling torque of an electric motor according to a stored torque curve profile, according to the present disclosure.

FIG. 2 is a flowchart illustrating an example process for controlling torque of an electric motor according to a stored torque curve profile. The process may be performed by, for example, a controller of the vehicle control module 20 and/or the remote computing device 30 of FIG. 1. At 204, the controller is configured to define speed ranges and increments for generating optimized torque profiles. For example, a range may be set at 20-60 mph with 5 mph increments.

At 208, the controller is configured to define an acceleration range and increments for generating the optimized torque profiles. For example, an acceleration range of 0.1 g (e.g., 0.1 times the acceleration of gravity) to 0.4 g may be specified, in 0.02 g increments.

Optimized torque profiles may be generated for the specified ranges and increments of the target speed and target acceleration values, at 212. An example of generating torque profiles for the specified ranges and increments of the target speeds and target acceleration values, is escribed further below with reference to FIG. 3.

At 216, the controller is configured to store optimized torque curves in the vehicle calibration tables. For example, the remote computing device 30 may generate optimized torque profiles for each combination of increments of the target speed and target acceleration values, and transmit the optimized torque profiles to the vehicle control module 20 for storage in a memory of the vehicle control module 20.

The controller is optionally configured to activate an acceleration mode control paddle at the steering wheel, at 220. For example, the acceleration paddle 28 may allow a driver to select various desired acceleration levels based a level of activation of the acceleration paddle 28 (e.g., how much the driver pulls on the acceleration paddle 28). An example of controlling motor torque (e.g., a torque of an electric motor of the drive unit 14 of FIG. 1) according to an acceleration paddle is described further below with reference to FIG. 3.

Figure 3:
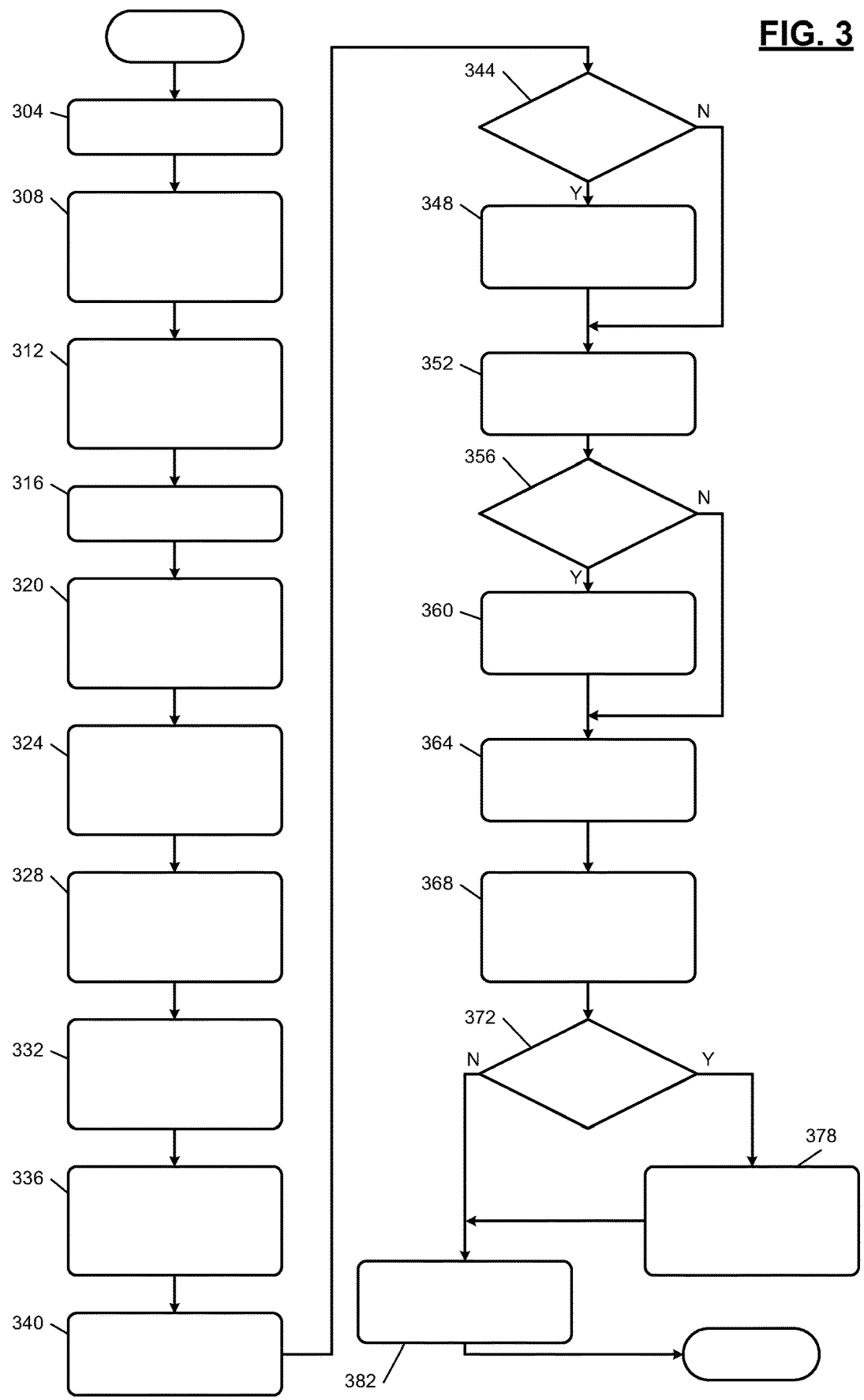
FIG. 3 is a flowchart illustrating an example process for generating a low energy torque curve profile for an electric vehicle motor, according to the present disclosure.

FIG. 3 is a flowchart illustrating an example process for generating a low energy torque curve profile for an electric vehicle motor. The process may be performed by, for example, the remote computing device 30 of FIG. 1. At 304, a controller of the remote computing device is configured to obtain an electric motor efficiency map.

At 308, the controller is configured to determine motor efficiency (such as efficiency of an electric motor of the drive unit 14 of FIG. 1), at multiple speed breakpoints and torques. For example, the controller may determine the efficiency at an array of possible torques (e.g., [10 Nm, 20 Nm . . . 450 Nm], etc.), for multiple motor speed breakpoints. Interpolation may be used if needed between possible torque values and/or motor speed breakpoints.

The controller of the remote computing device is configured to compute a power requirement to maintain each torque value until the next motor speed breakpoint, at 312. For example, the controller may compute an upstream power requirements (e.g., from the battery system 22 of FIG. 1), to maintain the specified torque value until the speed of the motor reaches a next speed breakpoint. An example formula is Power=(motor torque×motor speed)/time. This may be referred to as an average power matrix.

At 316, the controller is configured to obtain vehicle input values. For example, the controller may obtain one or more parameters specific to a unique vehicle, including but not limited to a tire rolling radius of the vehicle, a mass of the vehicle, vehicle road load coefficients, a final drive ratio (FDR), drive unit losses, etc.

The controller of the remote computing device may compute acceleration for each torque value between motor speed breakpoints, based on the vehicle parameters input values, at 320. For example, the controller may compute an acceleration that results from applying each torque value from one more speed breakpoint to the next, where the acceleration is calculated according to F=m×a. The force (F) may be equal to (motor torque×FDR/tire rolling radius)–road load coefficients–drive unit losses. The road load coefficients may be a road load at a current vehicle speed, and the drive unit losses may include drive unit loss at a current speed/torque of the motor.

At 324, the controller is configured to compute a time needed to reach a next speed breakpoint, based on the acceleration matrix. For example, the controller may determine a time period between motor speed breakpoints, using the acceleration calculated at 320, for each speed breakpoint value.

The controller of the remote computing device is configured to compute an energy required to move to a next speed for each torque value, at 328. For example, the controller may multiply values from the time required matrix with the average power matrix (e.g., using element-by-element multiplication, by using Hadamard multiplication, etc.), to compute an amount of energy that is needed to move from a current motor speed breakpoint to a next motor speed breakpoint.

At 332, the controller is configured to determine, at each speed breakpoint, which torque value uses a least (e.g., minimum) amount of energy to reach the next speed breakpoint. The index of minimum energy torque value in each row may correspond to an ideal operating point at that speed.

FIG. 4 illustrates an example of a table 400 illustrating energy required to move to a next speed breakpoint, for each torque setting. For example, each row of the table 400 may be a selected motor speed increment, and each column of the table 400 may be a possible torque setting of the electric motor.

The energy values located in the table for each pair of torque and speed, may represent the energy calculated as described above (e.g., power needed to maintain the torque at that speed, converted to a resulting acceleration and time required to reach the next motor speed breakpoint at that torque, which may be modified by vehicle-specific parameters). The controller may identify a lowest energy value in each row, to define a low energy torque curve path 402 from the initial speed breakpoint to the last speed breakpoint. The low energy torque curve path 402 may specify a torque setting to use at each speed breakpoint, in order to a traverse all speed breakpoints with a lowest amount of energy (which may be subject to torque constraints as described further below).

Returning to FIG. 3, at 336 the controller of the remote computing device is configured to set a torque command at each target speed to a road load torque at the target speed (e.g., a torque needed to maintain the vehicle at a desired final speed for a road after the acceleration maneuver is completed). The controller is configured to compute maximum torque constraints at each speed breakpoint, at 340.

At 344, the controller is configured to determine whether any points in the low energy torque curve path 402 (e.g., minimum energy path) violate a max torque constraint. For example, at all prior speed breakpoints, the controller may compute a maximum torque at which the electric motor can ramp down to the ending target road speed torque within a specified time period. This may be considered as a maximum torque constraint. As an example, if the torque should be twenty Nm at an ending target speed, the max torque at a motor speed breakpoint immediately prior to the ending target road speed may be twenty+a time taken to accelerate from the immediately prior motor speed breakpoint to the ending target road speed torque when using the torque setting specified by the low energy torque curve path 402 multiplied by a max rate of change of the motor torque.

If the controller of the remote computing device determines that any points in the low energy torque curve path 402 violate the max torque constraints at 344, control sets that operation point of the low energy torque curve path 402 to the maximum torque constraint at that motor speed breakpoint, at 348. After setting the operating point to the maximum torque constraint at 348, or determining at 344 that no points violate the maximum torque constraint, the controller is configured to set an optional minimum torque constraint at 352.

For example, a driver may desire at least a minimum amount of torque at low speeds for an enjoyable driving experience (e.g., at least 100 Nm when operating at the two lowest motor speed breakpoints, etc.). If the controller determines at 356 that any points in the low energy torque curve path 402 violate the minimum torque, the controller may set an operating point of the low energy torque curve path 402 to the minimum torque constraint at that motor speed breakpoint, at 360.

After setting the operating point to the minimum torque constraint value at 360, or after determining at 356 that no points in the low energy torque curve path 402 violate the minimum torque constraint, the controller is configured to determine a total time for the acceleration maneuver at 364 by summing time periods of each index in the low energy torque curve path 402. For example, the controller may sum up a time required at each torque and speed pair in the low energy torque curve path 402, to determine a total time required to accelerate from the first motor speed breakpoint to the last.

At 368, the controller of the remote computing device is configured to determine a different between the calculated total time for the acceleration maneuver, and a target acceleration time. For example, the target acceleration time may be indicated by a preference of a driver, where faster target times result in faster accelerations, and slower target times result in slower accelerations.

At 372, the controller compares the difference to an error threshold. For example, if the difference between the calculated total time for the acceleration maneuver and the desired target time is less than one second, the controller may consider the total time of the low energy torque curve profile to be sufficiently close to the desired target time, and store the torque versus speed path (e.g., the low energy torque curve path 402) at 382 for use in controlling motor torque for the drive unit 14 of the vehicle 10 of FIG. 1.

If the controller of the remote computing device determines at 372 that the difference between the total time of the acceleration maneuver and the desired tret time is too great, control proceeds to 378 to modify the low energy torque curve path 402 according to time modification logic. An example of time modification logic is described further below with reference to FIG. 5.

In some example embodiments, example acceleration optimization algorithms described herein (e.g., generation of optimized torque curves, etc.) may occur outside of the vehicle and vehicle controller, such as by the remote computing device 30 of FIG. 1 during development of the vehicle 10. The final results of the optimization algorithms (e.g., the final optimized torque curves, etc.) may then be programmed into, for example, the vehicle controller, for use when operating the vehicle. In various implementations, the vehicle controller does not have to generate the optimized torque curves, and can instead use torque curves that were optimized previously at a different computing system, and then stored in a memory of the vehicle.

Figure 5:
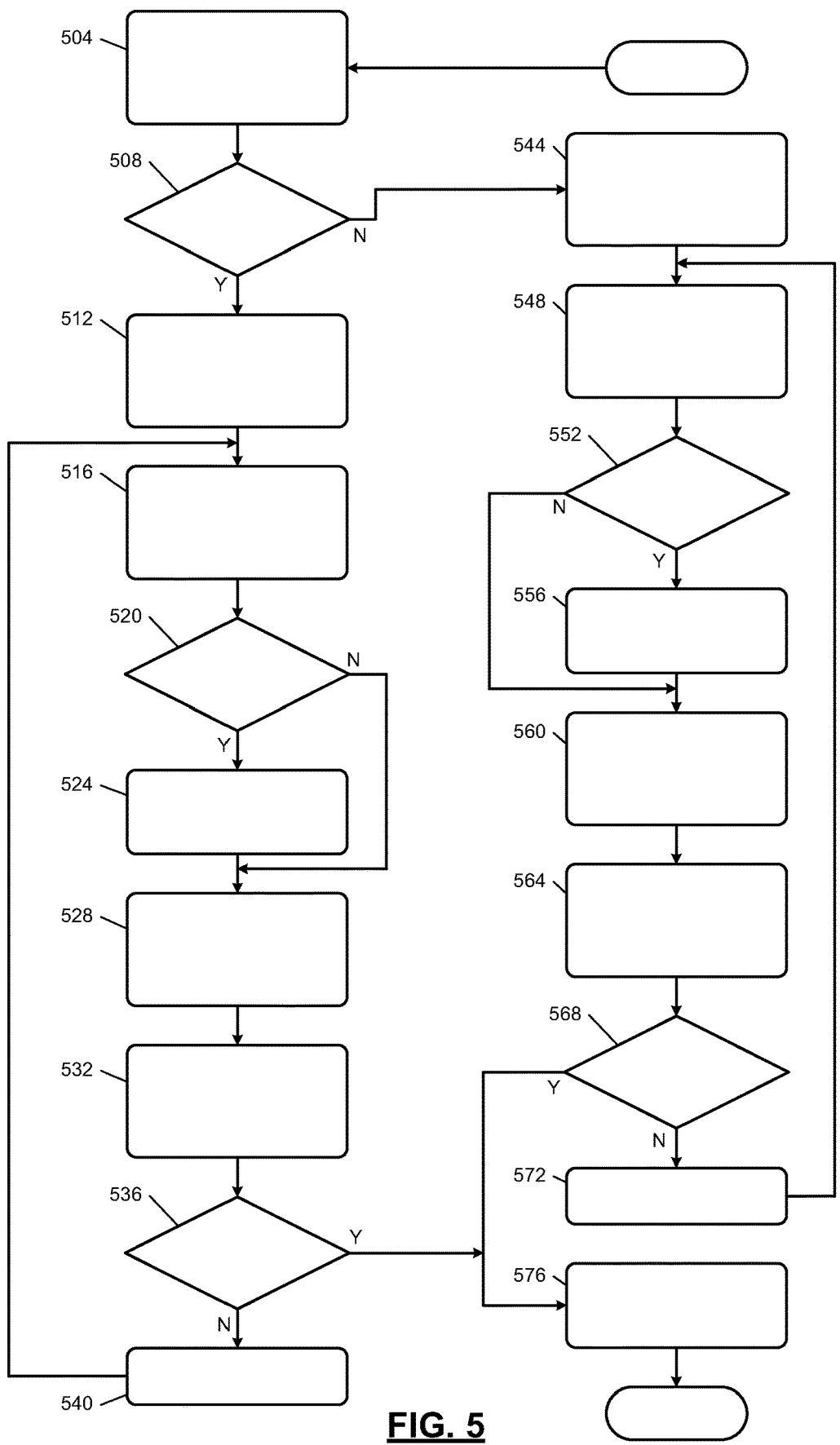
FIG. 5 is a flowchart illustrating an example process for modifying an acceleration time period of a torque curve profile, according to the present disclosure.

FIG. 5 is a flowchart illustrating an example process for modifying an acceleration time period of a torque curve profile. At 504, control determines a difference between a target acceleration time, and a calculated total time to complete an acceleration maneuver. At 508, the controller of the remote computing device is configured to determine whether the difference is positive or negative.

If the difference is positive at 508 (e.g., the calculated time is greater than the target time, so torque needs to be increased at one or more operating points to reduce a time taken for the acceleration maneuver), control determines time and energy differences between torques at each speed level, at 512. For example, using energy and time matrices, in each motor speed row, control may compute a difference in energy consumed between different torque settings in the row, a difference between time taken for each torque setting in the motor speed breakpoint row, and a dE/dt between all torque settings within the motor speed breakpoint row.

At 516, the controller of the remote computing device is configured to find the last index in the dE/dt array that is greater than an added energy tolerance value. For example, a negative dE/dt value may be specified (such as −0.001 Joule per second), as an initial minimum allowed tolerance value (e.g., the system is allowing an extra 0.001 Joule per second to be added to the low energy torque curve path 402 in order to reduce the time taken for the acceleration maneuver). The last index in the dE/dt array that is greater than the added energy tolerance value may be an operating point that will remove the most time from the acceleration maneuver, while incurring an acceptable energy penalty.

The controller is configured to compare the new operating point torque to a maximum torque constraint at 520. If the new operating point torque exceeds the max torque constraint, the controller sets the operating point to the max torque constraint value at the current speed level, at 524.

At 528, the controller of the remote computing device is configured to recalculate the total acceleration time using the modified one or more torque indices. The controller then determines a difference between the target acceleration time and the recalculated total acceleration time at 532. If the difference is less than the error threshold at 536, control proceeds to store the torque curve path for use by a vehicle control module (such as the vehicle control module 20 of FIG. 1) to control torque of an electric motor of a vehicle, at 576.

If control determines at 536 that the difference is still greater than the error threshold, control decrements the dE/dt tolerance value at 540 (e.g., to allow more energy to be added to the torque curve path in an effort to reduce the total acceleration time of the path to match the target time). Control then returns to 516 to find one more indexes of dE/dt that are greater than the decremented tolerance value, and repeats the process until the recalculated path time is reduced to within an error threshold of the target acceleration time.

Returning to 508, if the controller of the remote computing device determines that a difference between the target acceleration time and the calculated total time of the low energy torque curve path 402 is negative, control proceeds to 544 to determine time and energy differences between torque settings at each speed level.

At 548, the controller is configured to find an index of dE/dt that is less than an added energy tolerance value. For example, a positive dE/dt value may be specified (such as 0.001 Joule per second), as an initial minimum allowed tolerance value (e.g., the system is allowing an extra 0.001 Joule per second to be added to the low energy torque curve path 402 in order to increase the time taken for the acceleration maneuver by selecting slower and more energy consuming torque settings). The last index in the dE/dt array that is less than the added energy tolerance value may be an operating point that will add the most time from the acceleration maneuver, while incurring an acceptable energy penalty.

The controller of the remote computing device is configured to compare the new operating point torque to a minimum torque constraint at 552. If the new operating point torque is less than the minimum torque constraint, the controller sets the operation point to the minimum torque constraint value at the current speed level, at 556.

At 560, the controller is configured to recalculate the total acceleration time using the modified one or more torque indices. The controller then determines a difference between the target acceleration time and the recalculated total acceleration time at 564. If the difference is less than the error threshold at 568, control proceeds to store the torque curve path for use by a vehicle control module (such as the vehicle control module 20 of FIG. 1) to control torque of an electric motor of a vehicle, at 576.

If control determines at 536 that the difference is still greater than the error threshold, control increments the dE/dt tolerance value at 572 (e.g., to allow more energy to be added to the torque curve path in an effort to increase the total acceleration time of the path to match the target time). Control then returns to 548 to find one more indexes of dE/dt that are less than the incremented tolerance value, and repeats the process until the recalculated path time is increased to within an error threshold of the target acceleration time.

Figure 6:
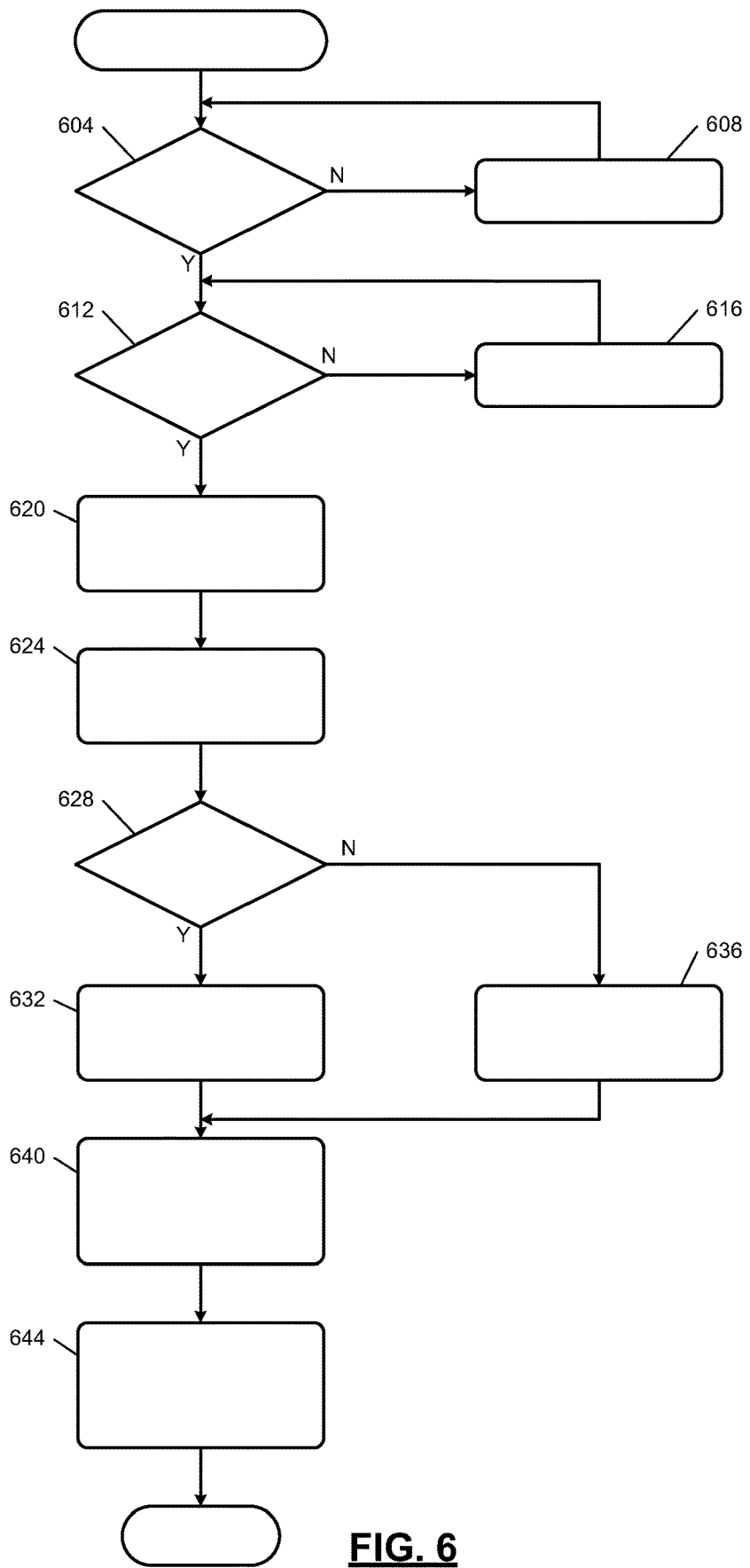
FIG. 6 is a flowchart illustrating an example process for selecting multiple torque profiles using an acceleration paddle, according to the present disclosure.

FIG. 6 is a flowchart illustrating an example process for selecting multiple torque profiles using an acceleration paddle. The example process of FIG. 6 may be initiated in response to a driver activating an acceleration paddle, such as the acceleration paddle 28 of FIG. 1.

At 604, control determines whether an optimized acceleration feature has been enabled for the vehicle. For example, a drive may have the option of turning on or turning off optimized acceleration according to a stored low energy torque curve profile. If the driver presses the acceleration paddle, but the optimized acceleration feature is not enabled at 604, control notifies the driver to enable the optimized acceleration feature at 608.

If the optimized acceleration features are enabled at 604, control proceeds to 612 to determine whether a current speed of the vehicle is within a range of speeds that may be operated according to the low energy torque curve profile. For example, if the low energy torque curve profile has motor speed breakpoints staring at ten mph and reaching sixty mph, and a current speed of the vehicle is less than ten mph or greater than sixty mph at 612, the controller may notify the driver that the vehicle is outside of the acceleration profile speed range at 616.

If the vehicle is within a speed range of the optimized acceleration torque curve profile at 612, control proceeds to 620 to set a target speed of the vehicle to a speed limit of a road the vehicle is driving on (or a nominal speed value, a desired target speed input by the driver, etc.). At 624, control determines whether the acceleration paddle is pressed to a first or a second level.

For example, the acceleration paddle may have multiple detents that allow the acceleration paddle to be activated at different levels (e.g., different positions relative to the steering wheel). If the acceleration paddle is at a first level at 628, the controller is configured to set an average acceleration command to a low value at 632.

If the acceleration paddle is at a second level at 628 (e.g., the driver has pulled the acceleration paddle past a first detent, to a second detent), the controller is configured to set an average acceleration command to a high value at 636. For example, a driver may be able to indicate a desire for slower acceleration when activating the acceleration paddle to a first level, and then indicate faster acceleration by pulling the acceleration paddle to a second level beyond the first.

At 640, control looks up a stored torque curve based on the acceleration value and the target speed. For example, the vehicle control module may include a table of stored torque curve profiles, each corresponding to different pairs of target speeds and desired accelerations. The table may have rows of target speeds, and columns of desired average accelerations (which may correspond to the levels of activation of the acceleration paddle), where each entry in the table is a numbered torque curve profile representing a low energy torque path for the desired target speed and the desired average acceleration, specific to the vehicle.

At 644, the controller is configured to apply the torque values of the selected curve, at each current vehicle speed, in order to complete the acceleration maneuver to the target speed. For example, an identified torque curve profile may specify a torque setting at multiple speed breakpoints up to the target speed. The controller may control torque settings of the motor of the vehicle based on the speed of the vehicle, until the vehicle accelerates to the target speed. An example of controlling torque of a motor is described further below, with reference to FIG. 7.

Figure 7:
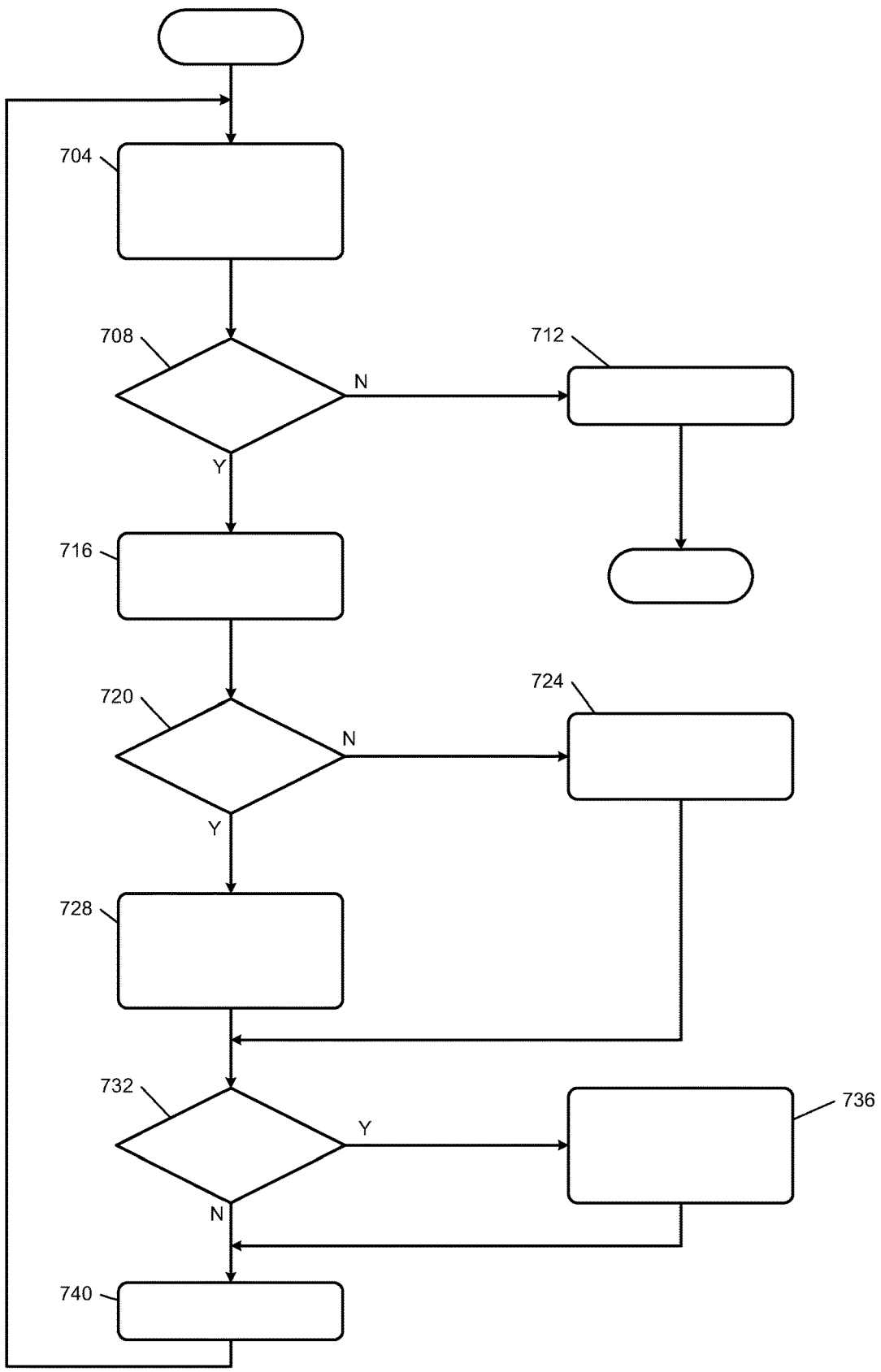
FIG. 7 is a flowchart illustrating an example process for controlling torque of an electric motor according to electric vehicle inputs, according to the present disclosure.

FIG. 7 is a flowchart illustrating an example process for controlling torque of an electric motor according to electric vehicle inputs. At 704, control beings by obtaining an optimized torque value, headway commands and estimated road grade inputs. For example, the optimized torque value may be a torque setting of a low energy torque profile at a motor speed breakpoint corresponding to a current speed of the vehicle.

The headway command may indicate whether a headway control system is active to maintain at least a minimum distance from another car located in front of the vehicle. The road grade inputs may be a signal indicative of a grade of the road where the vehicle is current driving, which may be based on global positioning system (GPS) signals and mapped road grades, may be based on comparing measured speed of the vehicle to expected speed of the vehicle on a flat grade, may be based on sensors estimating angles of the road in front or behind the vehicle using cameras or lasers, etc.

At 708, the controller is configured to determine whether the acceleration paddle is still depressed. If not, control exists the optimized acceleration control at 712, and ends the process. For example, the vehicle control module may only continue to control torque of the motor based on a low energy torque profile, as long as the driver continues to press the acceleration paddle.

The controller is configured to adjust an optimized torque value based on the road grade, at 716. For example, a torque value from the optimized low energy torque profile may be adjusted based on a current road grade, such as adding the optimized torque value to a product of the vehicle mass, the acceleration of gravity, an arctangent of the current road grade, and a tire rolling radius of the vehicle.

At 720, control determines if a headway control signal is active. If so, control sets the torque value to a minimum of a headway control torque command and the optimized torque value from the low energy torque profile, at 728. For example, if the headway control indicates that torque needs to be reduced below the specified torque value of the low energy torque profile in order to avoid a collision with a lead vehicle (e.g., because as distance from the lead vehicle is too small), the controller is configured to use the lower torque command indicated by the headway control signal. If control determines at 720 that the system is not using headway control, the controller sets the torque value to the optimized torque value from the low energy torque profile, at 724.

At 732, control determines whether the driver is pressing the acceleration pedal. For example, the driver may press the acceleration pedal with their foot while they are also pulling on the acceleration paddle, to indicate that they would like additional acceleration beyond what is currently provided by the optimized low energy torque profile. In that case, at 736 the controller sets the torque to a maximum of the driver requested torque from the acceleration pedal, and the optimized torque from the low energy torque curve profile (e.g., the controller will increase torque beyond the torque profile setting if the driver is pressing the accelerator pedal to a position that requires more torque than the low energy profile has specified at the current vehicle speed).

At 740, the controller is configured to command the set torque value to the electric motor (e.g., in view of possible adjustments based on road grade, headway control, driver acceleration pedal activation, or other adjustment factors), and returns to 704 to obtain new vehicle input parameters based on an updated speed, location and operation of the vehicle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An electric vehicle acceleration control system comprising:
    an electric motor configured to drive wheels of an electric vehicle;
    a steering wheel configured to steer the wheels of the electric vehicle;
    an acceleration paddle adjacent the steering wheel; and
    a vehicle control module configured to, in response to detecting activation of the acceleration paddle:
        set a target speed value;
        determine an average acceleration value to reach the target speed value;
        obtain a stored torque profile according to the target speed value and the average acceleration value, the stored torque profile including a specified torque value for each of multiple speed breakpoints;
        control the electric motor by commanding the specified torque value at each of the multiple speed breakpoints;
        determine a maximum torque constraint indicative of a maximum torque at which the electric motor is able to ramp down to a torque setting associated with the target speed value within a target acceleration time period between a current one of the multiple speed breakpoints and the target speed, wherein the maximum torque constraint is determined based on a maximum ramp rate of the motor to inhibit overshoot of the target ending speed; and
        in response to determining that a torque setting associated with the current one of the multiple speed breakpoints exceeds the maximum torque constraint, adjusting the torque setting associated with current one of the multiple speed breakpoints to a value of the maximum torque constraint.

2. The system of claim 1 wherein:
    the acceleration paddle includes a first detent at a first position relative to the steering wheel, and a second detent at a second position relative to the steering wheel; and
    the vehicle control module is configured to set the average acceleration value to a first acceleration setting in response to activation of the acceleration paddle to the first detent, and to set the average acceleration value to a second acceleration setting greater than the first acceleration setting in response to activation of the acceleration paddle to the second detent.

3. The system of claim 1, wherein the vehicle control module is configured to:
    obtain a speed limit value of a road where the electric vehicle is located; and
    set the target speed value to the obtained speed limit value.

4. The system of claim 1, wherein, in the stored torque profile, the specified torque value for each one of the multiple speed breakpoints is assigned by determining which one of multiple torque values of the electric motor uses a least amount of energy to advance a speed of the electric vehicle to a next one of the multiple speed breakpoints, subject to maximum and minimum torque constraints of the electric motor.

5. The system of claim 1, wherein the vehicle control module is configured to:
    determine a road grade of a road where the electric vehicle is located; and
    adjust the specified torque value associated with the one of multiple speed breakpoints corresponding to a current speed of the electric vehicle, according to the determined road grade.

6. The system of claim 1, wherein the vehicle control module is configured to:
    obtain a headway control signal indicative of a distance between the electric vehicle and another vehicle located in front of the electric vehicle; and
    adjust the specified torque value associated with the one of multiple speed breakpoints corresponding to a current speed of the electric vehicle, in response to the headway control signal commanding a lower torque value than the specified torque value.

7. The system of claim 1, wherein the vehicle control module is configured to:
  obtain an acceleration pedal signal indicative of a level of activation of an accelerator pedal of the electric vehicle; and
  adjust the specified torque value associated with the one of multiple speed breakpoints corresponding to a current speed of the electric vehicle, in response to the acceleration pedal signal commanding a greater torque value than the specified torque value.

8. The system of claim 1, wherein the vehicle control module is configured to stop controlling the electric motor according to the stored torque profile, in response to detecting deactivation of the acceleration paddle.

9. A method of controlling torque of an electric motor of an electric vehicle, the method comprising:
  defining multiple motor speed breakpoints associated with an acceleration path of an electric vehicle;
  obtaining, at each of multiple motor speed breakpoints, an efficiency value for each of multiple torque settings of an electric motor;
  at each torque setting for each motor speed breakpoint:
    computing an amount of power used from a battery system of the electric vehicle to maintain the torque setting until a next one of the multiple motor speed breakpoints is reached;
    determining a time period to accelerate from the motor speed breakpoint to a next one of the multiple motor speed breakpoints; and
    calculating an amount of energy consumed to accelerate from the motor speed breakpoint to a next one of the multiple motor speed breakpoints according to the amount of power and the time period;
  for each of the multiple motor speed breakpoints:
    identifying one of the multiple torque settings corresponding to the motor speed breakpoint, having a lowest amount of energy consumed; and
    storing the identified one of the multiple torque settings in a low energy torque curve profile;
  controlling operation of the electric motor according to the low energy torque curve profile;
  determining a maximum torque constraint indicative of a maximum torque at which the electric motor is able to ramp down to a torque setting associated with a target speed within a target acceleration time period between the motor speed breakpoint associated with at least one of the multiple torque settings and the target speed, wherein the maximum torque constraint is determined based on a maximum ramp rate of the motor to inhibit overshoot of the target ending speed; and
  in response to determining that the at least one of the multiple torque settings exceeds the maximum torque constraint, adjusting the at least one of the multiple torque settings to a value of the maximum torque constraint.

10. The method of claim 9, further comprising storing the low energy torque curve profile as an array of specified torque values each associated with a different vehicle speed value,
  wherein controlling operation of the electric motor includes commanding a one of the array of specified torque values corresponding to a determined speed of the electric vehicle.

11. The method of claim 10, wherein the low energy torque curve profile is a first low energy torque curve profile associated with a first target speed value and a first target acceleration value, the method further comprising:
  generating a second low energy torque curve profile according to a second target speed value and a second target acceleration value;
  storing the first low energy torque curve profile and the second low energy torque curve profile in a memory associated with a vehicle control module;
  obtaining a target speed input and a target acceleration input of the electric vehicle; and
  selecting one of the first low energy torque curve profile and the second low energy torque curve profile for controlling operation of the electric motor, based on the target speed input and a target acceleration input.

12. The method of claim 9, further comprising, at each of the multiple motor speed breakpoints:
  in response to determining that a torque setting of the low energy torque curve profile corresponding to the motor speed breakpoint exceeds the maximum torque constraint, adjusting the torque setting of the low energy torque curve profile to a value of the maximum torque constraint.

13. The method of claim 9, further comprising, at each of the multiple motor speed breakpoints:
  determining a minimum torque constraint indicative of a minimum desired acceleration value associated with the motor speed breakpoint; and
  in response to determining that a torque setting of the low energy torque curve profile corresponding to the motor speed breakpoint is less than the minimum torque constraint, adjusting the torque setting of the low energy torque curve profile to a value of the minimum torque constraint.

14. The method of claim 9, further comprising:
  obtaining the target acceleration time period between a first one of the multiple motor speed breakpoints and a last one of the multiple motor speed breakpoints;
  calculating a total acceleration time period between a first one of the multiple motor speed breakpoints and a last one of the multiple motor speed breakpoints according to each identified torque setting of the low energy torque curve profile; and
  in response to a difference between the target acceleration time period and the calculated total acceleration time period exceeding an error threshold, adjusting at least one identified torque setting of the low energy torque curve profile.

15. The method of claim 14, wherein the adjusting includes, in response to the target acceleration time period being less than the calculated total acceleration time period, increasing at least one of the torque settings of the low energy torque curve profile according to a difference in energy consumed between two different torque settings at a same one of the multiple motor speed breakpoints.

16. The method of claim 14, wherein the adjusting includes, in response to the target acceleration time period being greater than the calculated total acceleration time period, decreasing at least one of the torque settings of the low energy torque curve profiles according to a difference in energy consumed between two different torque settings at a same one of the multiple motor speed breakpoints.

17. The method of claim 16, further comprising:
  determining a minimum torque constraint indicative of a minimum desired acceleration value associated with the motor speed breakpoint associated with the decreased at least one of the identified torque settings and a target speed; and
  in response to determining that the decreased at least one of the torque settings is less than the minimum torque constraint, adjusting the decreased at least one of the torque settings to a value of the minimum torque constraint.

18. The method of claim 9, wherein determining the time period to accelerate from the motor speed breakpoint to a next one of the multiple motor speed breakpoints includes determining the time period based on at least one of a tire rolling radius of the electric vehicle, a mass of the electric vehicle, a vehicle road load coefficient, a final drive ratio, and a drive unit loss.

19. An electric vehicle acceleration control system comprising:
    an electric motor configured to drive wheels of an electric vehicle;
    a steering wheel configured to steer the wheels of the electric vehicle;
    an acceleration paddle adjacent the steering wheel; and
    a vehicle control module configured to, in response to detecting activation of the acceleration paddle:
        obtain a stored low energy torque profile from a memory associated with the vehicle control module, the stored low energy torque profile including, for each of multiple motor speed breakpoints, a specified torque value having a lowest amount of energy consumed within a group of torque values associated with the multiple motor speed breakpoint;
        determine a current speed of the electric vehicle and a target speed of the electric vehicle;
        control the electric motor by commanding the specified torque value of the stored low energy torque profile associated with the motor speed breakpoint that corresponds to the current speed of the electric vehicle;
        determine a maximum torque constraint indicative of a maximum torque at which the electric motor is able to ramp down to a torque setting associated with the target speed value within a target acceleration time period between a current one of the multiple motor speed breakpoints and the target speed, wherein the maximum torque constraint is determined based on a maximum ramp rate of the motor to inhibit overshoot of the target ending speed; and
        in response to determining that a torque setting associated with the current one of the motor speed breakpoints exceeds the maximum torque constraint, adjusting the torque setting associated with current one of the multiple motor speed breakpoints to a value of the maximum torque constraint.

* * * * *